United States Patent
Christie et al.

(10) Patent No.: US 6,325,847 B1
(45) Date of Patent: Dec. 4, 2001

(54) PRECIOUS METAL COLOR EFFECT MATERIALS AND PRODUCTION THEREOF

(75) Inventors: James Douglas Christie, Yonkers; Daniel Stevenson Fuller, Beacon; William Joseph Sullivan, Ossining; Curtis James Zimmermann, Cold Spring, all of NY (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/451,604

(22) Filed: Nov. 30, 1999

(51) Int. Cl.[7] .............. C09C 1/00; C09C 1/04; C09C 1/24; C09C 1/28; C09C 1/66
(52) U.S. Cl. .......... 106/417; 106/403; 106/415; 106/418; 106/419; 106/425; 106/436
(58) Field of Search .................... 106/415, 417, 106/418, 419, 425, 436, 403

(56) References Cited

U.S. PATENT DOCUMENTS

| | | | |
|---|---|---|---|
| 2,995,459 | * 8/1961 | Soloway | 106/290 |
| 3,438,796 | 4/1969 | Hanke | 106/291 |
| 4,434,010 | 2/1984 | Ash | 106/291 |
| 4,954,175 | * 9/1990 | Ito et al. | 106/417 |
| 4,954,176 | * 9/1990 | Minohara et al. | 106/417 |
| 5,030,445 | 7/1991 | Hashimoto et al. | 424/59 |
| 5,059,245 | 10/1991 | Phillips et al. | 106/22 |
| 5,135,812 | 8/1992 | Phillips et al. | 428/403 |
| 5,171,363 | 12/1992 | Phillips et al. | 106/22 |
| 5,279,657 | 1/1994 | Phillips et al. | 106/22 |
| 5,281,480 | 1/1994 | Phillips et al. | 428/412 |
| 5,540,770 | * 7/1996 | Schmid et al. | 106/415 |
| 5,624,486 | 4/1997 | Schmid et al. | 106/404 |
| 5,648,165 | 7/1997 | Phillips et al. | 428/346 |
| 5,766,335 | 6/1998 | Bujard et al. | 106/404 |
| 5,766,738 | 6/1998 | Phillips et al. | 428/200 |
| 5,958,125 | * 9/1999 | Schmid et al. | 106/417 |
| 6,013,370 | 1/2000 | Coulter et al. | 428/403 |
| 6,136,083 | 10/2000 | Schmidt et al. | 106/423 |
| 6,150,022 | 11/2000 | Coulter et al. | 428/403 |
| 6,157,489 | 12/2000 | Bradley, Jr. et al. | 359/584 |

FOREIGN PATENT DOCUMENTS

| | | |
|---|---|---|
| 0313281 | 4/1989 | (EP) . |
| 0353544 | 2/1990 | (EP) . |
| 0950693 | 10/1999 | (EP) . |

OTHER PUBLICATIONS

International Search Report (in English) issued Mar. 8, 2001 in a related application.

* cited by examiner

Primary Examiner—Mark L. Bell
Assistant Examiner—Michael J. DiVerdi
(74) Attorney, Agent, or Firm—Ostrolenk, Faber, Gerb & Soffen, LLP

(57) ABSTRACT

A precious metal color effect material is composed of a plurality of encapsulated substrate platelets in which each platelet is encapsulated with a first layer selected from the group consisting of silver, gold, platinum, palladium, rhodium, ruthenium, osmium, iridium and the alloys thereof, which acts as a reflector to light directed thereon, a second layer encapsulating the first layer in which the second layer provides an optically variable reflection of light impinging thereon and a third layer encapsulating the second layer and being selectively transparent to light directed thereon.

21 Claims, No Drawings

PRECIOUS METAL COLOR EFFECT MATERIALS AND PRODUCTION THEREOF

BACKGROUND OF THE INVENTION

Optically variable pigments have been described in the patent literature since the 1960s. Hanke in U.S. Pat. No. 3,438,796 describes the pigment as being "thin, adherent, translucent, light transmitting films or layers of metallic aluminum, each separated by a thin, translucent film of silica, which are successively deposited under controlled conditions in controlled, selective thicknesses on central aluminum film or substrate". These materials are recognized as providing unique color travel and optical color effects.

The prior art approaches to optically variable pigments have generally adopted one of two techniques. In the first, a stack of layers is provided on a temporary substrate which is often a flexible web. The layers are generally made up of aluminum and $MgF_2$. The stack of film is separated from the substrate and subdivided through powder processing into appropriately dimensioned flakes. The pigments are produced by physical techniques such as physical vapor deposition onto the substrate, separation from the substrate and subsequent comminution or by plasma decomposition, subsequent deflaking of the decomposition product, etc. In the pigments obtained in this way, the central layer and all other layers in the stack are not completely enclosed by the other layers. The layered structure is visible at the faces formed by the process of comminution.

In the other approach, a platelet shaped opaque metallic substrate is coated or encapsulated with successive layers of selectively absorbing metal oxides and non-selectively absorbing layers of carbon, metal and/or metal oxide. To obtain satisfactory materials using this approach, the layers are typically applied by chemical vapor deposition techniques in a fluidized bed. A major shortcoming of this technique is that fluidized bed processes are cumbersome and require substantial technical infrastructure for production. An additional limitation related to the substrates utilized is that traditional metal flakes usually have structural integrity problems, hydrogen outgassing problems and other pyrophoric concerns.

The prior art approaches suffer from additional disadvantages. For instance, certain metals or metal flake such as chromium, aluminum and brass may have perceived health and environmental impacts associated with their use. The minimization of their use in optical effect materials should be advantageous due to their perceived impact.

SUMMARY OF THE INVENTION

The present invention provides a precious metal color effect material (CEM) comprising a platelet-shaped substrate encapsulated with: (a) a highly reflective first layer to light directed thereon and being selected from the group consisting of silver, gold, platinum, palladium, rhodium, ruthenium, osmium, iridium and alloys thereof; and (b) a second layer encapsulating the first layer and providing a variable pathlength for light dependent on the angle of incidence of light impinging thereon in accordance with Snell's Law; and (c) a selectively transparent third layer to light directed thereon.

DESCRIPTION OF THE INVENTION

It is an object of the present invention to provide novel precious metal CEMs which can also be prepared in a reliable, reproducible and technically efficient manner. This object is achieved by a CEM comprising a platelet-shaped substrate coated with: (a) a highly reflective first layer to light directed thereon; and (b) a second layer encapsulating the first layer in which the second layer consists of a low index of refraction material, typically a refractive index from 1.3 to 2.5 and more specifically between 1.4 and 2.0, that provides a variable path length for light dependent on the angle of incidence of light impinging thereon; and (c) a selectively transparent third layer to light directed thereon. The degree of reflectivity for the first encapsulating layer should be from 100% to 5% reflectivity, whereas the selective transparency of the third encapsulating layer should be from 5% to 95% transmission. More specifically, one would prefer to have 50–100% reflectivity and 50–95% transparency for the first and third encapsulating layers, respectively. The degree of reflectivity and transparency for different layers can be determined by measuring a variety of methods such as ASTM method E1347-97, E1348-90 (1996) or F1252-89 (1996). The substrate can be mica, aluminum oxide, bismuth oxychloride, boron nitride, glass flake, iron oxide-coated mica (ICM), silicon dioxide, titanium dioxide-coated mica (TCM) or any encapsulatable smooth platelet. The first and third layers can be the same or different precious metals, i.e., silver, gold, platinum, palladium, rhodium, ruthenium, osmium and/or iridium or alloys thereof.

An advantage of the present invention is that one does not have to start with a traditional metal flake which may have structural integrity problems, hydrogen outgassing problems and a host of other perceived issues (pyrophoric and environmental concerns) typically associated with metal flakes. The precious metals used in this invention are much more chemically stable than aluminum and generally prefer to be in their non-oxidized metallic ground state. Furthermore, silver is preferred when employed as one of the reflecting layers, as it can maximize the chromaticity of the reflected color(s) of the CEM. In addition, when silver is used as the final (outer) layer of the particle, it imparts electrical conductivity to the CEM which may be desirable in some applications such as powder coatings.

A surprising aspect of the present invention is that cost effective composite materials are created with desirable color travel optical effect properties.

Metal layers are preferably deposited by electroless deposition and the non-metal layers preferably by sol-gel deposition. Surprisingly, when gold or platinum are used as the first layer of the CEM, another option for the deposition of the encapsulating metal oxide film or outside layers is from an aqueous sol-gel system. An advantage of electroless deposition (Egypt. J. Anal. Chem., Vol. 3, 118–123 (1994)) is that it is a world wide established chemical technique, not requiring cumbersome and expensive infrastructure compared to other techniques. The electroless deposition technique also allows one to control the degree of reflectivity of light quite accurately and easily by varying the metal film thickness. Additionally, the known procedures are generalized procedures capable of being utilized for coating a variety of surfaces. Furthermore, a layer of a metal or metal oxide can also be deposited onto any of the substrates by chemical vapor deposition from an appropriate precursor (The Chemistry of Metal CVD, edited by Toivo T. Kodas and Mark J. Hampden-Smith; VCH Verlagsgesellschaft mbH, D-69451 Weinheim, 1994, ISBN 3-527-29071-0).

An additional surprising aspect of the present invention is the tenacity with which the low index of refraction material adheres to the precious metal surface.

The products of the present invention are useful in automotive, cosmetic, industrial or any other application where metal flake or pearlescent pigments are traditionally used.

The size of the platelet-shaped substrate is not critical per se and can be adapted to the particular use. In general, the particles have average largest major dimensions of about 5–250 µm, in particular 5–100 µm. Their specific free surface area (BET) is in general from 0.2 to 25 m$^2$/g.

The CEMs of the invention are notable for multiple encapsulation of the platelet-shaped substrate.

The first encapsulating layer which is made of silver, gold, platinum, palladium, rhodium, ruthenium, osmium, iridium or their alloys is highly reflective to light directed thereon.

The thickness of the first layer is not critical so long as it is sufficient to make the layer highly reflective. If desirable, the thickness of the first layer can be varied to allow for selective transmission of light. Depending on the metal or alloy utilized for the first encapsulating layer, the thickness may be 2 nm to 100 nm and preferably 10 nm to 75 nm. For example, if silver is selected as the component of the first layer, the thickness may be at least about 5 nm, preferably from about 10 to 75 nm. However, when gold is used, the thickness may be at least about 4 nm, preferably from about 10 to 70 nm. The thickness of platinum as the first layer may be at least about 3 nm, preferably from about 5 to 65 nm. A metal or metal alloy layer thickness out of the above mentioned ranges will typically be either completely opaque or allow for substantial transmission of light. Naturally, one may utilize different layers of the above mentioned materials to obtain the desirable effect. For example, one may deposit a thin semi-transparent layer of gold on top of a reflective silver layer. In addition to their reflective properties, the metals may exhibit unique bulk color effects depending on the film thickness. For example, thin semi-transparent films of gold may appear more violet in color similar to the purple of Cassius. Gold leaf of less than 100 nm, which is less than the 350–700 nm wavelength of white light, appears bluish green when viewed by transmitted light. In the case of alloys, it is obvious that a near infinite number of alloys can be utilized in the present invention. A few alloy examples with their elemental constituents in parentheses are: sterling silver (silver and copper), coinage (gold and copper), rhodite (gold and rhodium), white gold (gold and palladium), yellow gold (gold, silver, copper, zinc and nickel) and gold plate (gold, silver and copper). The mass percent of the coating will be directly related to the surface area of the particular substrate being utilized.

The second encapsulating layer must provide a variable pathlength for light dependent on the angle of incidence of light impinging thereon and therefore, any low index of refraction material that is visibly transparent may be utilized. Preferably, the second layer is selected from the group consisting of silicon dioxide ($SiO_2$), suboxides of silicon dioxide ($SiO_{0.25}$ to $SiO_{1.95}$) or magnesium fluoride.

The thickness of the second layer varies depending on the degree of color travel desired. In addition, the second layer will have a variable thickness depending on a variety of factors, especially refractive index. Materials having a refractive index around 1.5 tend to require a film thickness of a few hundred nanometers for generation of unique color travel. For instance, a second layer has a preferable thickness of about 75 to 500 nm for silicon dioxide and for magnesium fluoride.

In one embodiment, the second layer is encapsulated by a selectively-transparent third layer that allows for partial reflection of light directed thereon. Preferably, the third encapsulating layer is selected from the group consisting of silicon, iron oxide, chromium oxide, a mixed metal oxide, titanium dioxide, titanium nitride and aluminum. More preferably, the third layer is one or more of the precious metals or alloys of the first layer.

Of course, the third layer can also contribute to the interference color of the pigment. Its thickness can vary but must always allow for partial transparency. For instance, a third layer has a preferable thickness of about 5 to 20 nm for silicon; about 2 to 15 nm for aluminum; about 1–15 nm for titanium nitride; about 10 to 60 nm for iron oxide; about 10 to 60 nm for chromium oxide; about 10–100 nm for titanium dioxide; about 5 to 60 nm for a mixed metal oxide, about 5 to 20 nm for silver; about 3 to 20 nm for gold; about 3–20 nm for platinum; and about 5 to 20 nm for palladium. The precious metal alloys generally have a similar film thickness compared to the pure metal or the alloy. It is recognized that a film thickness out of the above range may be applicable depending on the desired effect.

All the encapsulating layers of the CEM of the invention are altogether notable for a uniform, homogeneous, film-like structure that results from the manner of preparation according to the invention.

In the novel process for preparing the coated platelet-like substrates, the individual coating steps are each effected by electroless deposition or hydrolysis/condensation of suitable starting compounds in the presence of the substrate particles to be coated. For instance, metals can be deposited from reduction of aqueous salts of the metals, such as $HAuCl_4$, $AgNO_3$, $H_2PtCl_6$, $PdCl_2$. Silicon dioxide can be deposited from a compound selected from the group consisting of silicon tetraalkoxides such as tetraethoxysilane, bases such as sodium silicate and halide silanes such as silicon tetrachloride; titanium dioxide from tetraalkoxides such as titanium tetraethoxide, halide compounds such as titanium tetrachloride and sulfate compounds such as titanium sulfate, titanium nitride from titanium tetrachloride, tetrakis (diethylamido)titanium (TDEAT) and tetrakis (dimethylamido)titanium (TDMAT); iron oxide from iron carbonyl, iron sulfate and iron chloride; and chromium oxide from chromium carbonyl and chromium chloride.

In general, the synthesis of a color effect material can be as follows: a platelet material such as mica is suspended while stirring in an aqueous medium. To the suspension is added a precious metal precursor capable of depositing metal on the substrate by electroless deposition, along with a suitable reducing agent. The highly reflective metal coated substrate is filtered, washed and re-suspended in an alcoholic solvent such as butanol. A Stöber process can be employed for the deposition of silicon dioxide on the metal coated mica or other substrate (C. Jeffery Brinker and George W. Schera, Sol-Gel Science, The Physics and Chemistry of Sol-Gel Processing, Academic Press, Inc. (1990)). An alcoholic azeotropic mixture, such as ethanol and water, may be used in place of pure alcohol for the Stöber process. The silica encapsulated metal coated platelet is filtered, washed and re-suspended in a stirred aqueous medium. To the aqueous medium, a metal solution for electroless deposition is added as described above allowing for the deposition of a selectively transparent metal coating. The final particulate product is washed, dried and exhibits optical color effects as a function of viewing angle.

Depending on the thickness of the low refactive index second encapsulating layer, the final CEM will display multiple different color effects as a function of viewing angle (red, orange, green, violet). The platelet substrate acts as a carrier substrate. It may, or may not, have a contribution or effect on the final optical properties of the particulate.

The color effect materials (CEMs) of the invention are advantageous for many purposes, such as the coloring of paints, printing inks, plastics, glasses, ceramic products and decorative cosmetic preparations. Their special functional properties make them suitable for many other purposes. The CEMs, for example, could be used in electrically conductive or electromagnetically screening plastics, paints or coatings or in conductive polymers. The conductive functionality of the CEMs makes them of great utility for powder coating applications.

The above mentioned compositions in which the compositions of this invention are useful are well known to those of ordinary skill in the art. Examples include printing inks, nail enamels, lacquers, thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile.

Due to its good heat resistance, the pigment is particularly suitable for the pigmenting of plastics in the mass, such as, for example, of polystyrene and its mixed polymers, polyolefins, in particular polyethylene and polypropylene and the corresponding mixed polymers, polyvinyl chloride and polyesters in particular polyethylene glycol terephthalate and polybutylene terephthalate and the corresponding mixed condensation products based on polyesters.

For a well rounded introduction to a variety of pigment applications, see Temple C. Patton, editor, The Pigment Handbook, volume II, Applications and Markets, John Wiley and Sons, New York (1973). In addition, see for example, with regard to ink: R. H. Leach, editor, The Printing Ink Manual, Fourth Edition, Van Nostrand Reinhold (International) Co. Ltd., London (1988), particularly pages 282–591; with regard to paints: C. H. Hare, Protective Coatings, Technology Publishing Co., Pittsburg (1994), particularly pages 63–288. The foregoing references are hereby incorporated by reference herein for their teachings of ink, cosmetic, paint and plastic compositions, formulations and vehicles in which the compositions of this invention may be used including amounts of colorants. For example, the pigment may be used at a level of 10 to 15% in an offset lithographic ink, with the remainder being a vehicle containing gelled and ungelled hydrocarbon resins, alkyd resins, wax compounds and aliphatic solvent. The pigment may also be used, for example, at a level of 1 to 10% in an automotive paint formulation along with other pigments which may include titanium dioxide, acrylic latices, coalescing agents, water or solvents. The pigment may also be used, for example, at a level of 20 to 30% in a plastic color concentrate in polyethylene.

EXAMPLE 1

Procedure For Evaluation of CEMs According to the Invention

The luster and color are evaluated using drawdowns on a hiding chart (Form 2–6 Opacity Charts of the Leneta Company) both visually and instrumentally. A drawdown on the black portion of the card displays the reflection color while the white portion displays the transmission color at non-specular angles.

The drawdowns are prepared by incorporating 3–12% CEM in a nitrocellulose lacquer, with the concentration dependent on the particle size distribution of the CEM. For example, a 3% drawdown would likely be used for an average CEM particle size of 20 $\mu$m while a 12% drawdown might be used for an average CEM particle size of 100 $\mu$m. The CEM-nitrocellulose suspension is applied to the drawdown card using a Bird film application bar with a wet film thickness of 3 mil.

When these drawdowns are observed visually, a variety of colors can be observed dependent on the viewing angle, such as, aqua to blue to violet. The degree of color travel observed is controlled by the thickness of the low index of refraction layer. Other quantifiable parameters commonly used to describe effect pigments, such as lightness (L*) and chromaticity (C*), can be controlled through both: a) the choice of materials used as lower reflecting and top, selectively transmitting layers and b) the thickness of said lower and top layers.

The drawdowns were further characterized using a goniospectrophotometer (CMS-1500 from Hunter). The reflectivity vs. wavelength curves were obtained at various viewing angles. The color travel for the CEM was described using the CIELab L*a*b* system. The data is recorded both numerically and graphically. The numerical recording for a CEM representative of that obtained in example 2 is as follows:

| Angle | a* | b* | C* | h* |
|---|---|---|---|---|
| 10/10 | 10.31 | −32.6 | 34.19 | 287.55 |
| 20/20 | 27.2 | −35.13 | 44.43 | 307.75 |
| 30/30 | 44.62 | −26.04 | 51.66 | 329.74 |
| 40/40 | 47.2 | 0.78 | 47.21 | 0.94 |
| 50/50 | 25.28 | 24.07 | 34.91 | 43.6 |
| 60/60 | 0.35 | 21.02 | 21.02 | 89.05 |

The L*a*b* data characterizes the appearance of the sample. L* is the lightness/darkness component, a* describes the red/green color component, b* represents the blue/yellow component, C is the chromaticity and h is the hue.

EXAMPLE 2

Silver is deposited according to well established electroless deposition techniques as demonstrated in the following example.

One hundred grams of 100 micron glass flakes (100 micron average major dimension) and hereinafter referred to as "100 micron glass flake" is placed in a 1 liter beaker equipped with a magnetic stir bar and containing 393 grams of a 2% dextrose solution. The slurry is stirred at room temperature.

To the slurry is rapidly added a solution which is prepared as follows: 7.87 grams of silver nitrate crystals are dissolved into 375 ml distilled water using a magnetic stirrer. A 29% solution of ammonium hydroxide is added dropwise to the beaker resulting in a brown precipitate which redissolves at a higher concentration of the ammonium hydroxide solution. At the point where the solution becomes clear again, 5 extra drops of the ammonium hydroxide solution is added to ensure excess.

Several changes in the shade of the slurry occur as the reaction proceeds. After 15 minutes of stirring, the supernatant liquid is tested for silver ion by the addition of a few drops of concentrated hydrochloric acid. The test is a visual assessment of any precipitate and/or turbidity of which none is found. The slurry is filtered and rinsed several times with distilled water and the presscake is dried at 100° C. to a constant mass. The dried sample is a lustrous, opaque and silver colored material.

50 grams of the above material is slurried into 600 ml. of isopropanol at 25° C. To the slurry is added 75 grams of distilled water, 3.5 grams of 29% $NH_4OH$ and 75 grams of tetraethoxysilane. The slurry is stirred for 7 hours at room temperature and then filtered, and the product washed and oven dried.

10 grams of this silica-coated material is slurried into 50 grams of 1% dextrose solution. A solution of 0.4 grams of $AgNO_3$, 40 grams of water and a slight excess of 29% ammonium hydroxide solution is quickly added to the slurry. Within 1 minute of stirring, the slurry produces an intense blue color. The slurry supernatant liquid tests negative for unreduced silver ion after 15 minutes of stirring based on the visual assessment outlined above. The slurry is filtered and the product washed and dried at 120° C. The product displays a very clean color flop from blue to violet upon a change in viewing angle of a lacquer film containing the product.

EXAMPLE 3

100 grams of 100 micron glass flakes encapsulated with a 100 nm thick film of titanium dioxide capable of generating optical interference are placed in a 1L beaker equipped with a magnetic stir bar and containing 250 grams of a 1% dextrose solution. The slurry is stirred at room temperature.

To the slurry is rapidly added a solution which is prepared as follows: 2.5 grams of silver nitrate crystals are dissolved into 250 mls. of distilled water using a magnetic stirrer. A 29% solution of ammonium hydroxide is added dropwise to the beaker resulting in a brown precipitate which redissolves at a higher concentration of the ammonium hydroxide solution. At the point where the solution becomes clear again, 5 extra drops of the ammonium hydroxide solution is added to ensure excess.

Several changes in the shade of the slurry occur as the reaction proceeds. After 30 minutes of stirring, the supernatant liquid is tested for silver ion and none is found. The slurry is filtered and rinsed several times with distilled water and the presscake is dried at 100° C. to a constant mass. The dried sample is a lustrous, highly reflective silver colored material, with an enhanced white pearl effect due to the selective, however limited, transmitted light through the encapsulating silver layer.

100 grams of the above material is slurried into 1200 mls. of isopropanol at 25° C. To the slurry is added 150 grams of distilled water, 7.0 grams of 29% ammonium hydroxide solution and 150 grams of tetraethoxysilane. The slurry is stirred for 7 hours at room temperature and then filtered, and the product washed and oven dried.

10 grams of this silica-coated material is slurred into 50 grams of 1% dextrose solution. A solution of 0.40 grams of silver nitrate, 40 grams of water and a slight excess of 29% ammonium hydroxide solution is quickly added to the slurry. Within 1 minute of stirring, the slurry produces an intense green color. The slurry supernatant liquid tests negative for unreduced silver ion after 15 minutes of stirring as determined according to the testing described in Example 2. The slurry is filtered and the product washed and dried at 120° C. The product displays a very clean color flop from green to violet upon a change in viewing angle of a lacquer film containing the product.

EXAMPLE 4

2.28 grams of 100 micron glass flake (BET area=0.22 $m^2/gr$) is placed into a 250 ml. PYREX beaker with a magnetic stirring bar. 200 grams of a chromic acid solution of composition 1.2% sodium dichromate dihydrate and 98.8% concentrated sulfuric acid is added to the beaker. The slurry is stirred and heated to 100° C. and held at this temperature for 10 minutes. The slurry is then allowed to cool to near room temperature, poured slowly into 500 ml. of distilled water to dilute the acid, vacuum filtered and rinsed free of acid with distilled water.

43.9 grams (0.30 moles) of adipic acid and 100 ml. distilled water is placed into a 400 ml. PYREX beaker with a magnetic stirring bar. While stirring the slurry, a solution of 24.0 grams (0.60 moles) of sodium hydroxide pellets dissolved into 100 ml. of distilled water is added to the beaker. Finally, a solution of 30.2 grams (0.755 moles) of sodium hydroxide pellets dissolved in 100 ml. of distilled water is added to the beaker. The resulting solution formed is nearly saturated. Finally, 4.96 grams of an HCl stabilized $HAuCl_4$ solution containing 39.7% Au by weight is added to the beaker and homogenized to a clear, yellow solution.

The cleaned glass flake is transferred quantitatively to a 400 ml. PFA TEFLON™ beaker. The complexed $HAuCl_4$ solution is also added to the TEFLON™ beaker. 80 ml. of methanol is added to the beaker and placed into a boiling water bath. A plastic mechanical propeller agitator is used to stir the slurry vigorously while heating in the bath. The slurry proceeds through several changes in color and appearance until after approximately 20 minutes, the reaction appears complete since the supernatant liquid is now clear and colorless. The slurry is vacuum filtered and the presscake rinsed free of solutes with distilled water and dried to a constant mass in a 100° C. oven. The yield of product is 4.07 grams which indicated that 91% of the reduced gold is deposited as a film onto the glass flakes and the other 9% is deposited as a gold foil onto the plastic agitator.

The coated glass flakes have the desired appearance of bulk gold. The theoretical gold film thickness is calculated to be 212 nm. The platelets were examined by both optical and electron microscopy, which revealed that the gold layer is composed of relatively large crystallites.

5 grams of the gold coated glass flake is slurried into 60 ml of isopropanol at 25° C. 7.5 g of distilled water, 0.35 g of 29% $NH_4OH$ and 7.5 g tetraethoxysilane is added to the slurry and stirred for 5 hours at room temperature. The product is then filtered, washed and oven dried.

1 gram of this silica-coated material is slurried into 5 grams of a 1% dextrose solution. A solution of 0.04 g of $AgNO_3$, 4 grams of water and a few drops (excess) of 29% ammonium hydroxide solution is quickly added to the slurry. The slurry is stirred for 15 minutes, filtered, product washed and dried at 120° C.

EXAMPLE 5

8.83 grams of 100 micron glass flake (BET area=0.22 $m^2/gr$) is placed into a 250 ml. PYREX beaker with a magnetic stirring bar. 200 grams of a chromic acid solution of composition 1.2% sodium dichromate dihydrate and 98.8% concentrated sulfuric acid is added to the beaker. The slurry is stirred and heated to 100° C. and held at this temperature for 10 minutes. The slurry is then allowed to cool to near room temperature, poured slowly into 500 ml. of distilled water to dilute the acid, vacuum filtered and rinsed free of acid with distilled water.

1.28 grams (0.011 moles) of maleic acid is dissolved into 10 ml. of distilled water and transferred into a 100 ml. volumetric flask. 1.24 grams (0.031 moles) of sodium hydroxide (pellets) is dissolved into 10 ml. of distilled water and transferred to the volumetric flask. 2.98 grams (0.02 moles) of triethanolamine is added to the flask and swirled to homogenize the solution. Subsequently, 10.0 grams of 1,4 dioxane is added to the flask and swirled to homogenize the solution. 1.76 grams of an HCl stabilized $H_2PtCl_6$ solution containing 33.3% Pt by weight is added to the flask and diluted to the 100 ml. mark with distilled water to obtain a clear red solution.

The cleaned glass flake is quantitatively transferred to a 200 ml. PTFE TEFLON™ beaker. The 100 ml of complexed $H_2PtCl_6$ solution is added to the beaker. 10.0 ml. of 35% hydrazine solution is added to the beaker, resulting in a slight color change accompanied by a small amount of evolved gas. The beaker is placed into a boiling water bath and the slurry stirred with a plastic propeller mechanical agitator while heating. The slurry proceeds through several gradual color changes. After approximately 60 minutes of heating and stirring, the glass flake suspension is coated with a very bright silvery layer and the supernatant liquid is clear and colorless, indicating that the reaction is complete. The slurry is vacuum filtered, the presscake rinsed free of solutes with distilled water and dried to a constant mass in a 100° C. oven. From this procedure a quantitative yield of reduced platinum is deposited on the glass flakes. A negligible mass of platinum is plated onto the plastic propeller.

The product displays the desirable color and luster of bulk platinum. The platinum film thickness is calculated to be 14 nm. The powder is examined by both optical and electron microscopy. A smooth continuous film of platinum is present on the glass flake and composed of very small crystallites.

5 grams of the above product is encapsulated with a silica layer and a final outer silver layer in accordance with Example 4 above to make a CEM.

EXAMPLE 6

3.00 grams of 50 micron average diameter (major dimension) mica flake (BET area=2.00 $m^2$/gr) is placed into a 100 ml. PYREX beaker with a magnetic stirring bar. 100 grams of a chromic acid solution of composition 1.2% sodium dichromate dihydrate and 98.8% concentrated sulfuric acid is added to the beaker. The slurry is stirred and heated to 100° C. and held at this temperature for 10 minutes. The slurry is then allowed to cool near room temperature, poured slowly into 500 ml. of distilled water to dilute the acid, vacuum filtered and rinsed free of acid with distilled water.

3.83 grams (0.033 moles) of maleic acid is dissolved into 20 ml. of distilled water and transferred into a 100 ml. volumetric flask. 3.72 grams (0.093 moles) of sodium hydroxide (pellets) is dissolved into 20 ml. of distilled water and transferred to the volumetric flask. 8.95 grams (0.06 moles) of triethanolamine is added to the flask and swirled to homogenize the solution. 30.0 grams of 1,4 dioxane is added to the flask and swirled to homogenize the solution. 5.27 grams of an HCl stabilized $H_2PtCl_6$ solution containing 33.3% Pt by weight is added to the flask, diluted to the 100 ml. mark with distilled water to obtain a clear red solution.

The cleaned mica flake is quantitatively transferred to a 200 ml. PTFE TEFLON™ beaker. The 100 ml. of complexed $H_2PtCl_6$ solution is added to the beaker. 30.0 ml. of 35% hydrazine solution is added to the beaker, resulting in a slight color change accompanied by a small amount of evolved gas. The beaker is placed into a boiling water bath and the slurry stirred with a plastic propeller mechanical agitator while heating. The slurry proceeded through several gradual color changes. After approximately 90 minutes of heating and stirring, the mica suspension is coated with a very bright silvery layer and the supernatant liquid is clear and colorless, indicating that the reaction is complete. The slurry is vacuum filtered, the presscake rinsed free of solutes with distilled water and dried to a constant mass in a 100° C. oven. A quantitative yield of reduced platinum is deposited on the mica flakes. A negligible mass of platinum is plated onto the plastic propeller.

The product exhibits the desirable color and luster of bulk platinum. The platinum coated film thickness is calculated to be 14 nm. The platinum mica is examined by both optical and electron microscopy. A smooth, continuous film is present and composed of very small crystallites. The product is incorporated into a nitrocellulose lacquer at a 3% loading and drawn down to a 0.003 inch wet film. This paint film displays excellent silvery color and reflectivity.

50 grams of the above material is slurried into 600 ml of isopropanol at 25° C. 75 grams of distilled water, 3.5 grams of 29% NaOH and 75 grams of tetraethoxysilane is added to the slurry. The slurry is stirred for 9 hours at room temperature, filtered, the product washed and oven dried at 100° C.

10 grams of the above product is slurried into 50 grams of 1% dextrose solution. 0.4 grams of $AgNO_3$ in 40 grams of distilled water and a slight excess of 29% ammonium hydroxide is quickly added to the slurry. The slurry is stirred for 15 minutes, filtered and the product washed and dried at 120° C.

EXAMPLE 7

80 grams of 50 micron average diameter mica is added to a 4 liter beaker equipped with a magnetic stir bar and containing 1542 grams of a 2% dextrose solution. The slurry was stirred at room temperature.

To the slurry was rapidly added a solution which is prepared as follows: 31.5 grams of silver nitrate crystals is dissolved into 1500 ml. distilled water using a magnetic stirrer. A 29% ammonium hydroxide solution is added dropwise to the beaker resulting in a brown precipitate which redissolves at a higher concentration of the ammonium hydroxide solution. At the point where the solution becomes clear again, 20 extra drops of the ammonium hydroxide solution is added, 36.8 grams total.

Several changes in the shade of the slurry occurs as the reaction proceeds. After 30 minutes of stirring, the supernatant liquid is tested for silver ion as in Example 2 and none is found. The slurry is filtered and rinsed several times with distilled water and the presscake dried at 100° C. to a constant mass. The dried sample is a lustrous, highly reflective and silver color material.

50 grams of the above material is slurried into 600 ml of isopropanol at 25° C. 75 grams of distilled water, 3.5 grams of 29% $NH_4OH$ and 75 grams of tetraethoxysilane is added to the slurry. The slurry is stirred for 9 hours at room temperature, filtered, the product washed and oven dried at 100° C.

10 grams of the above product is slurried into 50 grams of 1% dextrose solution. 0.4 grams of $AgNO_3$ in 40 grams of distilled water and a slight excess of 29% ammonium hydroxide is quickly added to the slurry. While stirring, the slurry quickly exhibits an intense blue color. The slurry is filtered and the product washed and dried at 120° C. The product exhibits similar color travel to the product obtained in Example 2, however on a much smaller particulate platelet.

EXAMPLE 8

A CEM sample prepared according to Example 2 is incorporated into polypropylene step chips at 1% concentration. The step chips are appropriately named since they have graduating thickness at each step across the face of the chip. Chips containing the CEM exhibit unique color travel as a function of viewing angle. Light microscopy reveals the platelets distributed throughout the polymeric chip with many platelets exhibiting variable color effects indicative of a CEM.

EXAMPLE 9

Nail enamels were prepared using a CEM prepared according to Example 2. 10 g of CEM product were mixed with 82 g of suspending lacquer SLF-2, 4 g lacquer 127P and 4 g ethyl acetate. The suspending lacquer SLF-2 is a generic nail enamel consisting of butyl acetate, toluene, nitrocellulose, tosylamide/formaldehyde resin, isopropyl alcohol, dibutyl phthalate, ethyl acetate, camphor, n-butyl alcohol and silica. The final nail enamel exhibited unique color travel effects as a function of viewing angle when applied to a finger nail.

EXAMPLE 10

A 10% by weight equal parts dry blend of CEM's prepared according to Example 2, however, one sample having a slightly thicker silicon dioxide encapsulating layer and therefore a red to green color flop, is prepared. The powder mix was sprayed in Polyester TGIC powder coatings from Tiger Drylac using PGI Corona Gun #110347. The pigments were mixed into two different bases to accentuate and vary the effect.

1. The pigments were mixed in a clear polyester system and sprayed over a RAL 9005 Black powder sprayed base.

2. The pigments were mixed into a RAL 9005 Black pigmented polyester powder. The color effect material was highly attracted to the ground metal panel due to its electrical properties and upon curing exhibited unique color travel effects. Additionally, due to its high affinity for the grounded panel substrate, the CEM appeared to orient closely to the surface that resulted in a finish that has high distinctness of image (DOI) and did not require an additional clear coat to reduce protrusions often caused by traditional pearlescent and metal flake pigments.

EXAMPLE 11

A 10% dispersion of the color effect material prepared according to Example 2 in Nazdar 2727 Aqueous Gloss P.O.P. Screen Ink (overprint clear) was prepared and screen printed through a 60 mesh screen onto a mylar substrate. The resulting mylar film exhibited unique blue to violet color travel effects.

EXAMPLE 12

10 grams of color effect material were mixed into a clear acrylic urethane basecoat clearcoat paint system DBX-689 (PPG) along with various PPG tints to achieve desired color. The tint pastes consist of organic or inorganic colorants dispersed at various concentrations in a solventborne system suitable with the DMD Deltron Automotive Refinish paint line from PPG. Completed formulations were sprayed using conventional siphon feed spraygun onto 4×12" curved automotive type panels supplied by Graphic Metals. Panels clear coated with PPG 2001 high solids polyurethane clear coat. Panels air dried.

Various changes and modifications can be made in the process and products of the invention without departing from the spirit and scope thereof. The various embodiments disclosed herein were for the purpose of illustration only and were not intended to limit the invention.

What is claimed is:

1. A precious metal color effect material comprising a platelet-shaped substrate encapsulated with:
    (a) a highly reflective first layer to light directed thereon and being selected from the group consisting of silver, gold, platinum, palladium, rhodium, ruthenium, osmium, iridium and alloys thereof; and
    (b) a second layer encapsulating the first layer and providing a variable pathlength for light dependent on the angle of incidence of light impinging thereon; and
    (c) a selectively transparent third layer to light directed thereon.

2. The color effect material of claim 1, wherein the substrate is selected from the group consisting of mica, aluminum oxide, bismuth oxychloride, boron nitride, glass flake, iron oxide-coated mica, silicon dioxide and titanium dioxide-coated mica.

3. The color effect material of claim 2, wherein the first encapsulating layer is silver.

4. The color effect material of claim 2, wherein the first encapsulating layer is gold.

5. The color effect material of claim 2, wherein the first encapsulating layer is platinum.

6. The color effect material of claim 2, wherein the first encapsulating layer is palladium.

7. The color effect material of claim 2, wherein the first encapsulating layer is said alloy.

8. The color effect material of claim 1, wherein the second encapsulating layer is selected from the group consisting of silicon dioxide and magnesium fluoride.

9. The color effect material of claim 8, wherein the second encapsulating layer is silicon dioxide.

10. The color effect material of claim 2, wherein the third encapsulating layer is selected from the group consisting of silver, gold, platinum, palladium and alloys thereof.

11. The color effect material of claim 10, wherein the third encapsulating layer is silver.

12. The color effect material of claim 2, wherein the third layer is selected from the group consisting of silicon, titanium dioxide, iron oxide, chromium oxide, a mixed metal oxide, and aluminum.

13. The color effect material of claim 1, wherein the first layer is an electroless deposition layer.

14. The color effect material of claim 2, wherein the second layer is a sol-gel deposition layer.

15. The color effect material of claim 2, wherein the substrate is platelet-shaped mica, the highly reflective first encapsulating layer is silver, the second encapsulating layer is silicon dioxide and the third encapsulating layer is a selectively transparent layer of silver.

16. The color effect material of claim 2, wherein the substrate is platelet-shaped mica, the highly reflective first encapsulating layer is gold, the second encapsulating layer is silicon dioxide and the third encapsulating layer is a selectively transparent layer of silver.

17. The color effect material of claim 2, wherein the substrate is platelet-shaped mica, the highly reflective first encapsulating layer is platinum, the second encapsulating layer is silicon dioxide and the third encapsulating layer is a selectively transparent layer of silver.

18. The color effect material of claim 2, wherein the substrate is platelet-shaped mica, the highly reflective first encapsulating layer is palladium, the second encapsulating layer is silicon dioxide and the third encapsulating layer is a selectively transparent layer of silver.

19. A method of making a precious metal color effect material comprising:
(a) coating a platelet-shaped substrate with a highly reflective first encapsulating layer to light directed thereon and selected from the group consisting of silver, gold, platinum, palladium, rhodium, ruthenium, osmium, iridium and alloys thereof;
(b) encapsulating the first layer with a second layer providing a variable pathlength for light dependent on the angle of incidence of light impinging thereon; and
(c) encapsulating the second layer with a selective transparent third layer to light directed thereon.

20. The method of claim 19, wherein the substrate is selected from the group consisting of mica, aluminum oxide, bismuth oxychloride, glass flake, silicon dioxide, iron oxide-coated mica, titanium dioxide coated glass and titanium dioxide-coated mica.

21. The method of claim 20, wherein the second layer is selected from the group consisting of silicon dioxide and magnesium fluoride, and wherein the third layer is selected from the group consisting of silver, gold, platinum, palladium, alloys of said metals, silicon, iron oxide, chromium oxide, a mixed metal oxide and aluminum.

* * * * *